(12) United States Patent
Wartena et al.

(10) Patent No.: US 11,854,054 B2
(45) Date of Patent: Dec. 26, 2023

(54) ADAPTIVE ENERGY STORAGE OPERATING SYSTEM FOR MULTIPLE ECONOMIC SERVICES

(71) Applicant: Growing Energy Labs, Inc., San Francisco, CA (US)

(72) Inventors: Ryan Craig Wartena, San Francisco, CA (US); Ernest Crispell Wagner, San Francisco, CA (US); Zachary Raymond Ernst, Oakland, CA (US)

(73) Assignee: Growing Energy Labs, Inc., San Francisco, CA (US)

( * ) Notice: Subject to any disclaimer, the term of this patent is extended or adjusted under 35 U.S.C. 154(b) by 81 days.

(21) Appl. No.: 17/315,116

(22) Filed: May 7, 2021

(65) Prior Publication Data

US 2021/0263486 A1 Aug. 26, 2021

Related U.S. Application Data

(63) Continuation of application No. 16/428,623, filed on May 31, 2019, now abandoned, which is a continuation-in-part of application No. 15/729,193, filed on Oct. 10, 2017, now Pat. No. 10,409,241, and a continuation-in-part of application No. 14/814,510, filed on Jul. 31, 2015, now abandoned, said application No. 15/729,193 is a continuation of application No. 13/898,283, filed on May 20, 2013, now Pat. No. 9,817,376.

(60) Provisional application No. 62/031,804, filed on Jul. 31, 2014, provisional application No. 61/649,278, filed on May 19, 2012.

(51) Int. Cl.
*H02J 4/00* (2006.01)
*G06Q 30/0601* (2023.01)
*G05B 15/02* (2006.01)
*H02J 3/28* (2006.01)
*H02J 3/38* (2006.01)

(52) U.S. Cl.
CPC ........ *G06Q 30/0605* (2013.01); *G05B 15/02* (2013.01); *H02J 4/00* (2013.01); *H02J 3/28* (2013.01); *H02J 3/38* (2013.01)

(58) Field of Classification Search
USPC ........................................................ 700/297
See application file for complete search history.

(56) References Cited

U.S. PATENT DOCUMENTS 6,985,799 B2  1/2006  Zalesski et al.
7,274,975 B2  9/2007  Miller et al.
(Continued)

FOREIGN PATENT DOCUMENTS

CN   1866286 A    11/2006
CN   102597639 A  7/2012
(Continued)

OTHER PUBLICATIONS

EP20160745.4 European Search Report dated May 27, 2020.
(Continued)

*Primary Examiner* — Jason D Mitchell
(74) *Attorney, Agent, or Firm* — Harness, Dickey & Pierce, P.L.C.

(57) ABSTRACT

The present disclosure provides an adaptive energy storage operating system that is programmed or otherwise configured to operate and optimize various types of energy storage devices.

20 Claims, 5 Drawing Sheets

(56) References Cited

U.S. PATENT DOCUMENTS

| | | |
|---|---|---|
| 7,385,373 B2 | 6/2008 | Doruk et al. |
| 7,490,175 B2 | 2/2009 | Rosenbloom et al. |
| 7,612,466 B2 | 11/2009 | Skutt et al. |
| 8,294,286 B2 | 10/2012 | Hunter et al. |
| 8,548,635 B2 | 10/2013 | Watson et al. |
| 8,600,571 B2 | 12/2013 | Dillon et al. |
| 8,791,665 B2 | 7/2014 | Davis et al. |
| 8,855,829 B2 | 10/2014 | Golden et al. |
| 8,874,772 B2 | 10/2014 | Boldt |
| 8,886,362 B2 | 11/2014 | Krok et al. |
| 8,922,063 B2 | 12/2014 | Taddeo et al. |
| 8,957,623 B2 | 2/2015 | Sisk et al. |
| 9,292,803 B2 | 3/2016 | Kalogridis et al. |
| 9,817,376 B1 | 11/2017 | Wartena et al. |
| 10,409,241 B2 | 9/2019 | Wartena et al. |
| 2002/0184304 A1 | 12/2002 | Meade et al. |
| 2004/0044442 A1 | 3/2004 | Bayoumi et al. |
| 2004/0113588 A1 | 6/2004 | Mikuriya et al. |
| 2004/0220758 A1 | 11/2004 | Barsoukov et al. |
| 2004/0230343 A1 | 11/2004 | Zalesski et al. |
| 2004/0254899 A1 | 12/2004 | Abe et al. |
| 2006/0038660 A1 | 2/2006 | Doumuki et al. |
| 2006/0158037 A1 | 7/2006 | Danley et al. |
| 2006/0259255 A1 | 11/2006 | Anderson et al. |
| 2007/0005192 A1 | 1/2007 | Schoettle et al. |
| 2007/0067413 A1 | 3/2007 | Nishio et al. |
| 2007/0143045 A1 | 6/2007 | Macgregor et al. |
| 2007/0168576 A1 | 7/2007 | Rosenbloom et al. |
| 2007/0266121 A1 | 11/2007 | Saeed et al. |
| 2008/0046387 A1 | 2/2008 | Gopal et al. |
| 2008/0167756 A1 | 7/2008 | Golden et al. |
| 2008/0211230 A1 | 9/2008 | Gurin et al. |
| 2008/0262820 A1 | 10/2008 | Nasle et al. |
| 2008/0276257 A1 | 11/2008 | Fuchs et al. |
| 2008/0281663 A1 | 11/2008 | Hakim et al. |
| 2009/0189456 A1 | 7/2009 | Skutt et al. |
| 2009/0273313 A1 | 11/2009 | Scott et al. |
| 2009/0278498 A1 | 11/2009 | Lai et al. |
| 2010/0262312 A1 | 10/2010 | Kubota et al. |
| 2010/0301810 A1 | 12/2010 | Biondo et al. |
| 2011/0082598 A1 | 4/2011 | Boretto et al. |
| 2011/0099264 A1 | 4/2011 | Chapin et al. |
| 2011/0119687 A1 | 5/2011 | Mcgovern et al. |
| 2011/0204720 A1 | 8/2011 | Ruiz et al. |
| 2011/0258471 A1 | 10/2011 | Daniel et al. |
| 2011/0289517 A1 | 11/2011 | Sather et al. |
| 2012/0029716 A1 | 2/2012 | Sekoguchi et al. |
| 2012/0029897 A1 | 2/2012 | Cherian et al. |
| 2012/0046795 A1 | 2/2012 | Kelty et al. |
| 2012/0046798 A1 | 2/2012 | Orthlieb et al. |
| 2012/0049516 A1 | 3/2012 | Viassolo |
| 2012/0053750 A1 | 3/2012 | Viassolo et al. |
| 2012/0059527 A1 | 3/2012 | Beaston et al. |
| 2012/0059532 A1 | 3/2012 | Reifenhaeuser et al. |
| 2012/0068540 A1 | 3/2012 | Luo et al. |
| 2012/0083930 A1 | 4/2012 | Ilic et al. |
| 2012/0089261 A1 | 4/2012 | Kim |
| 2012/0101639 A1 | 4/2012 | Carralero et al. |
| 2012/0109403 A1 | 5/2012 | Shelton et al. |
| 2012/0109797 A1 | 5/2012 | Shelton et al. |
| 2012/0109798 A1 | 5/2012 | Shelton et al. |
| 2012/0116955 A1 | 5/2012 | Prosser et al. |
| 2012/0117411 A1 | 5/2012 | Stanley-Marbell |
| 2012/0146585 A1 | 6/2012 | Darcy |
| 2012/0173873 A1 | 7/2012 | Bell et al. |
| 2012/0189878 A1 | 7/2012 | Basson et al. |
| 2012/0200160 A1 | 8/2012 | Pratt et al. |
| 2012/0235624 A1 | 9/2012 | Sisk et al. |
| 2012/0242148 A1 | 9/2012 | Galati et al. |
| 2012/0248873 A1 | 10/2012 | Oudalov et al. |
| 2012/0253527 A1 | 10/2012 | Hietala et al. |
| 2012/0280573 A1 | 11/2012 | Ohkura et al. |
| 2012/0280694 A1 | 11/2012 | Song et al. |
| 2012/0296482 A1* | 11/2012 | Steven .................. G06Q 40/04 700/291 |
| 2012/0331202 A1 | 12/2012 | Cohen et al. |
| 2013/0041517 A1 | 2/2013 | Nelson et al. |
| 2013/0073104 A1 | 3/2013 | Sciacchitano et al. |
| 2013/0093246 A1 | 4/2013 | Rostami |
| 2013/0096728 A1 | 4/2013 | Steffes et al. |
| 2013/0117767 A1 | 5/2013 | Myrah et al. |
| 2013/0158725 A1 | 6/2013 | Anderson et al. |
| 2013/0245847 A1 | 9/2013 | Steven et al. |
| 2013/0261803 A1 | 10/2013 | Kolavennu |
| 2013/0274935 A1 | 10/2013 | Deshpande et al. |
| 2014/0006807 A1 | 1/2014 | Oglesby et al. |
| 2014/0015469 A1 | 1/2014 | Beaston et al. |
| 2014/0018971 A1 | 1/2014 | Ellis et al. |
| 2014/0039709 A1 | 2/2014 | Steven et al. |
| 2014/0039710 A1 | 2/2014 | Carter et al. |
| 2014/0052396 A1 | 2/2014 | Jin et al. |
| 2014/0129040 A1 | 5/2014 | Emadi et al. |
| 2014/0129197 A1 | 5/2014 | Sons et al. |
| 2014/0172503 A1 | 6/2014 | Hammerstrom et al. |
| 2014/0277794 A1 | 9/2014 | Kaufman et al. |
| 2014/0278617 A1 | 9/2014 | Kaufman et al. |
| 2014/0330611 A1 | 11/2014 | Steven et al. |
| 2015/0278968 A1* | 10/2015 | Steven .................. G06Q 50/06 705/7.35 |
| 2016/0036272 A1 | 2/2016 | Wartena et al. |
| 2019/0317463 A1 | 10/2019 | Wartena et al. |

FOREIGN PATENT DOCUMENTS

| | | |
|---|---|---|
| WO | WO-2013039554 A1 | 3/2013 |
| WO | WO-2014078336 A1 | 5/2014 |
| WO | WO-2016019278 A1 | 2/2016 |

OTHER PUBLICATIONS

Notice of Allowance dated Jul. 19, 2017 for U.S. Appl. No. 13/898,283.
Office action dated Jan. 4, 2016 for U.S. Appl. No. 13/898,283.
Office Action dated Mar. 24, 2017 for U.S. Appl. No. 13/898,283.
Office Action dated Sep. 8, 2016 for U.S. Appl. No. 13/898,283.
PCT/US2015/043177 International Search Report and Written Opinion dated Nov. 9, 2015.
U.S. Appl. No. 14/814,510 Office Action dated Feb. 21, 2018.
U.S. Appl. No. 14/814,510 Office Action dated Jul. 27, 2017.
U.S. Appl. No. 14/814,510 Office Action dated Jun. 7, 2018.
U.S. Appl. No. 14/814,510 Office Action dated Mar. 4, 2019.
U.S. Appl. No. 15/729,193 Notice of Allowance dated Jun. 13, 2019.
U.S. Appl. No. 15/729,193 Office Action dated Feb. 7, 2019.
U.S. Appl. No. 16/428,623 Office Action dated Aug. 20, 2020.

\* cited by examiner

ADAPTIVE ENERGY STORAGE OPERATING SYSTEM FOR MULTIPLE ECONOMIC SERVICES

CROSS-REFERENCE

This application is a continuation of U.S. patent application Ser. No. 16/428,623, filed on May 31, 2019, which is a continuation-in-part claiming priority to U.S. patent application Ser. No. 15/729,193, filed on Oct. 10, 2017, now U.S. Pat. No. 10,409,241, which claims priority to U.S. patent application Ser. No. 13/898,283, filed on May 20, 2013, now U.S. Pat. No. 9,817,376, which claims priority to U.S. Provisional Patent Application No. 61/649,278, filed on May 19, 2012; the application U.S. patent application Ser. No. 16/428,623, filed on May 31, 2019, is also a continuation-in-part claiming priority to U.S. patent application Ser. No. 14/814,510, filed Jul. 31, 2015, which claims priority to U.S. Provisional Patent Application No. 62/031,814, filed Jul. 31, 2014, each of which are entirely incorporated herein by reference.

BACKGROUND

Energy storage devices or systems are capable of storing energy in various forms (e.g., mechanical, chemical, electrochemical, potential, electrical) for later release and use for individual, multiple and/or simultaneous applications. Their operation can be controlled and managed.

SUMMARY

The present disclosure provides a software operating system to operate, optimize and manage network energy storage systems for multiple value streams. Energy operating systems of the present disclosure can coordinate the components of an energy storage system to capture value from any number of services that the energy storage system can provide individually and/or as a networked configuration. The energy operating system can operate locally as an embedded system on the energy storage system and/or on external servers.

In some situations, the core of the energy operating system is an energy computing module to optimize the operation of the energy storage system based on adaptive rules and algorithms for each of the services. The inputs to the rules and algorithms are exterior pricing signals, communications signals, rate structures, electrical system status, electrical system forecast and operator preferences. The outputs are adaptive operational signals for energy storage system hardware components and/or peripheral devices, energy and economic data, including control signals for other devices and reporting functions.

The software can be designed or implemented as an operating system. The operating system can be modular. The appropriate energy services for the site and desired functions can be installed, updated and maintained as a computer program or application. Further, the library structure of the energy operating system can allow any energy storage system hardware component and/or peripheral electrical devices to be integrated with drivers, thereby not requiring changes in the energy services. Additionally, the library structure can include operational libraries based upon evolving standards, which can be designed or otherwise configured to be updated without affecting other modules of the energy operating system. Finally, the database architecture of the energy operating system can have a private side for system operations and a public side for the storage, acquisition, publishing and broadcasting of energy availability data, energy operation data, economic data and operational signals.

An aspect of the present disclosure provides a system for automating, managing and/or monitoring an energy storage system. The system comprises a plurality of drivers, a set of libraries, and a plurality of applications. Each driver among the plurality of drivers can be programmed to enable communication with an energy storage system upon execution by a computer processor. Each library among the set of libraries, upon execution by a computer processor, can implement energy-related data transformations and/or energy-related data calculations using input from the energy storage system, wherein the input is provided with the aid of a given driver among the plurality of drivers that is selected for the energy storage system. Each application among the plurality of applications can be selectable by an operator of the system to perform an energy- and/or economic-related function using input from the energy storage system that is provided with the aid of the given drivers and libraries.

In another aspect of the present invention, a method of creating models for use in a predictive analytics engine and subsequent operation of the engine in an adaptive energy operating system is described. The performance of an energy application for an energy asset is modeled. The energy asset health for an energy asset is modeled. The cost efficiency for the energy asset is modeled. A forward operating profile for the energy application is created. A forward availability profile for the energy asset is created.

In another aspect, a method of operating an adaptive energy operating system in communication with one or more energy assets is described. A forward availability profile for an asset and a forward operating profile for an application are received. A predictive analytics data package containing three models is received. Runtime operation profile data and runtime asset profile data are collected. Runtime operation profile data and asset profile data are compared with the models. The asset profile data is transformed into energy asset life characteristic data. A forward availability profile and forward operating profile are updated.

Another aspect of the present disclosure provides an adaptive energy management platform that can be configured to remotely operate a plurality of distributed energy assets. A distributed energy asset in the plurality of distributed energy assets can be configured to perform a plurality of energy applications. The platform can be configured to generate an application performance model for each of the plurality of energy applications performed by the energy asset, generate a health model for the energy asset, and generate a revenue generation model for the energy asset. The platform can then generate an energy asset model for the energy asset based on the application performance model, the health model, and the revenue generation model. Based on the energy asset model, the platform can create an initial forward availability profile for the energy asset. The initial forward availability profile can define at least a distribution of battery capacity among the plurality of energy applications performed by the energy asset that co-optimizes performance of the plurality of energy applications.

In some embodiments, generating the application performance model for each of the plurality of energy applications can involve analyzing historical output data captured during performance of each energy application by the energy asset.

In some embodiments, generating the health model for the energy asset can involve analyzing degradation of the energy asset over time.

In some embodiments, the platform can be further configured to dynamically optimize operation of the energy asset in real-time and during operation by updating the energy asset model based on a difference between one or more predictions derived from the energy asset model and actual operational performance of the energy asset. Upon updating the energy asset model, the platform can re-compute the initial forward availability profile.

In some embodiments, the platform can be further configured to create a forward operating profile for each of the plurality of energy applications performed by the energy asset. In some embodiment, the platform can be further configured to combine the forward availability profile and the forward operating profile with energy asset characteristic data and historical data, thereby enabling predictive analysis. In some embodiments, the platform can be further configured to create a predictive analytics data package containing the forward operating profile and the forward availability profile. In some embodiments, the platform can be further configured to perform predictive analytics for operation and management of the distributed energy asset. In some embodiments, the platform can be further configured to simulate performance of the plurality of energy applications when performing the modeling.

In some embodiments, generating the health model for the energy asset can involve examining degradation as a function of use. In some embodiments, generating the health model for the energy asset can involve examining degradation as a function of calendar life.

In some embodiments, generating the revenue generation model for the energy asset can involve dynamically connecting energy operations with financial data. In some embodiments, generating the revenue generation model for the energy asset can involve predicting revenue that the energy asset is expected generate over its lifetime.

In some embodiments, the platform can include an adaptive energy operating system, and the plurality of distributed energy assets can each perform the plurality of energy applications using the same algorithms and processes as those used in the adaptive energy operating system.

In some embodiments, the platform can operate over a cloud.

Another aspect of the present disclosure provides methods corresponding to the operations performed by the system above.

Another aspect of the present disclosure provides a non-transitory computer readable medium comprising machine executable code that, upon execution by one or more computer processors, implements any of the operations performed by the system above.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." or "FIGs." herein) of which:

DETAILED DESCRIPTION

Figure 1:
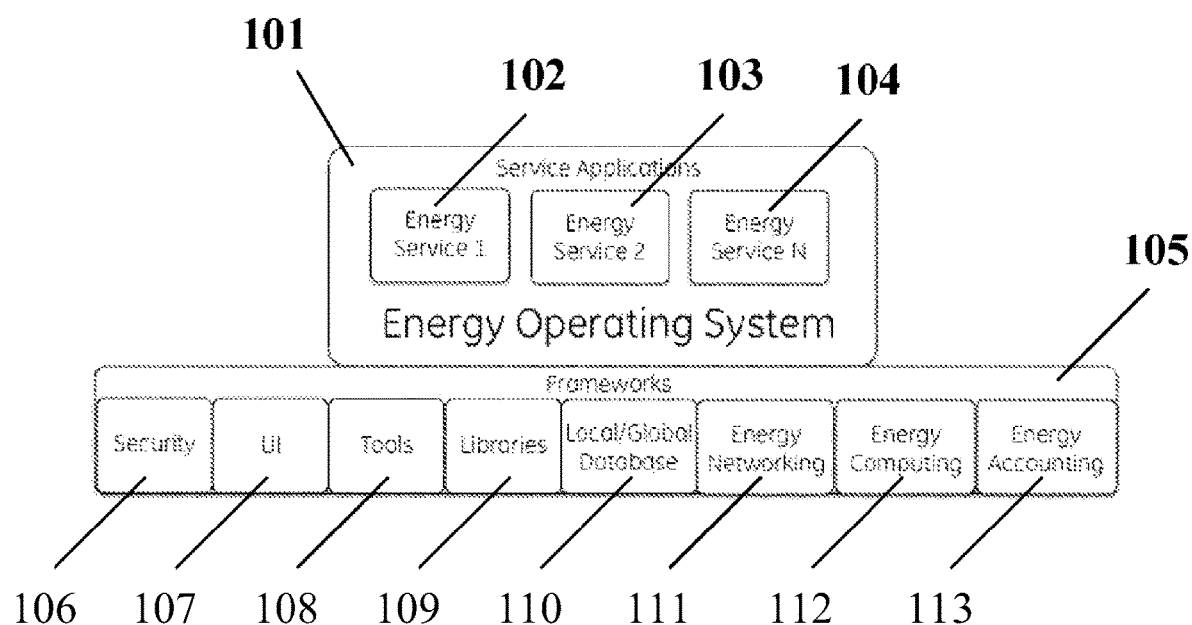
FIG. 1 schematically illustrates system architecture and framework for an energy operating system with multiple adaptive energy services for the optimal operation of energy storage systems for multiple value streams, in accordance with various embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

An aspect of the disclosure provides a system comprising an adaptive energy storage operating system (also "adaptive operating system" or "energy operating system" herein). The system can include an adaptive energy storage operating system that is programmed or otherwise configured to communicate with an energy storage system, and its components (e.g., power conversion system, battery management system, electrical meters, electrical relays, etc.) and optimize the operation of the energy storage system, such as, for example, based on adaptive rules and algorithms.

The system can comprise one or more device drivers, each configured to operate or control a given energy storage device. A given driver can be a program that can run on the system to operate or control an energy storage device or energy storage system component. The driver can communicate with the energy storage device through a computer bus of the system or communications subsystem that is connected to the energy storage device. The driver can enable sophisticated communication of data (e.g., automation, algorithmic control) between the device and the system. In some cases, the driver may interface with or one or more industrial control systems, such as, for example, one or more device-specific drivers. The driver may utilize one or more communication or control protocols. The driver can communicate with various types of devices (e.g., devices requiring different communication or control protocols) such that devices can interface with the system in a plug and play fashion. The drivers of the present disclosure can enable the system to interface to numerous types of drivers and devices. In some embodiments, the drivers of the present disclosure can be selected by a user, automatically detected upon connection of a device, or a combination thereof. The drivers can enable one or more devices to be integrated with the adaptive operating system without affecting the remainder of the adaptive operating system.

In some examples, a system comprises an adaptive energy storage operating system. A user couples the system to an energy storage system, and the adaptive energy storage operating system automatically recognizes the type of energy storage system and configures the system for use with the energy storage system. As an alternative, an operator can configure the system for use with the energy storage system by selecting appropriate drivers.

In some examples, when a calling program (e.g., an energy management program or an energy service application) of the system invokes a routine in the energy operating system core and/or in a driver of the system, the driver issues one or more commands to the energy storage device. Once the energy storage device sends data back to the driver, the driver can invoke routines in the original calling program.

A driver can be hardware-dependent and operating-system-specific. The driver can provide interrupt handling required for any necessary asynchronous time-dependent hardware interface. The driver can enable the system to interface with a power conversion system and/or a battery management system of an energy storage system.

The system can further include one or more libraries. A library can be a collection of implementations of behavior, written in terms of a language that can have a well-defined interface by which the behavior is invoked. The library can be used by any one of a plurality of programs of the system. A given library can include reference materials for the system.

The system can include a plurality of libraries. In some examples, the system includes a utility rate structure library, a smart grid communication protocol library and a manufacturer operating parameters library. A given library can perform or be used to perform actions, transformations and calculations with various operating energy storage device operating parameters. In some cases, an application can be configured to perform such actions, transformations and calculations.

The system can include applications that are programmed or otherwise configured to run on the adaptive operating system. An application can be selected by an operator of an energy storage device for various uses. An application can be provided for various functions (e.g., actions, transformations, calculations) or energy services, such as, for example, detecting energy storage device charge, ancillary services, optimum demand charge management, time of use shifting, demand shifting, demand response, electric vehicle charging.

Libraries and/or applications can perform actions, provide limitations on system parameters, transform and calculate data and operation signals, and generate commands for drivers to deliver to energy storage system devices and components. In some cases, the core of the energy operating system can perform the calculations. The drivers can translate and relay communications and control signals.

FIG. 1 shows a system 100 comprising an energy operating system 101, in accordance with various embodiments of the present disclosure. The energy operating system 101 includes one or more energy service applications 102, 103, 104 each corresponding to one or more functions or energy services. Examples of functions of energy storage services include, without limitation, demand charge management, time of use shifting, demand response, ancillary services, energy capacity, electric vehicle charging, spinning reserve capacity, ramp rate service, renewable energy firming, frequency regulation, voltage regulation, transformer unloading and management, peaking power, emergency and backup power services, and power quality services. The energy operating system 101 can comprise software for implementing the applications 102, 103, 104. The energy operating system can be implemented on a computer system (e.g., system 200 in FIG. 2). The system can be implemented locally (e.g., at a site of an energy storage device). Software can run different applications locally. In some cases, the system can communicate with one or more other systems over a network. In some cases, the energy operating system can be implemented locally and centrally (e.g., at a central site controlling multiple energy storage devices).

In some embodiments, the system 100 can include various frameworks 105 for building the applications 102, 103, 104. The frameworks 105 can be separate from the energy operating system 101. As an alternative, the frameworks 105 can be included in the energy operating system 101. For example, the energy operating system 101 can include a security framework 106, which can comprise security protocols and data protection hardware and software, such as, for example, firewall, active event alerts and authentication software. The energy operating system 101 can include a user interface (UI) framework 107, including, for example, software and graphical tools for implementing a graphical user interface and a communications interface for interfacing with one or more devices, networks, or other systems. The system can further include various tools 108, including, but not limited to, tools for building drivers, tools for setting permissions (e.g., user access level, clearance, permission to override automatic control, permission to export or report data), tools for creating user accounts etc.

The energy operating system 101 can further include one or more libraries 109. The libraries can include reference data or reference materials, such as, for example, utility rate structures. The reference data can be for local economic values and operational parameters to be utilized in applications, algorithms, and programs. The utility rate structures can include local economic rate information for supply and demand on a power basis and on a total energy basis. In some cases, the libraries comprising different reference materials can be provided separately. In other cases, one or more libraries can be combined and/or integrated.

Further information which may be stored in libraries can include statistical data, exterior pricing signals, communications signals, rate structures, electrical system status and operator preferences. In some embodiments, such data can be included in one or more databases 110. The databases 110 can be local (e.g., on site and accessible over a network), global (e.g., centrally maintained and locally accessible over a network), or a combination thereof (e.g., a copy of a database can be maintained locally in addition to a global database). Further, the databases 110 can have a public portion (e.g., available to one or more users over a network or published or reported externally) and a private portion (e.g., available for system operation, to one or more users of the energy operating system, or monitoring data saved for troubleshooting purposes). The data in the databases 110 can include, for example, device-level data, usage and performance data and energy and economic data.

In an example, the libraries 109 can further include one or more drivers. The drivers can enable different devices to be plugged in and integrated with the system locally without affecting other parts of the system (e.g., without affecting applications implemented by the system). The drivers enable hardware (e.g., energy storage devices) to be integrated with the energy operating system in an abstract fashion.

The frameworks 105 can further include an energy networking framework 111 and an energy computing framework 112. The energy networking framework 111 can include, for example, software, tools, methods and/or protocols for communication between energy operating systems; for arranging, conditionally aggregating operations, coordinating and managing energy operating systems and energy storage devices over a network; for calculating, analyzing and balancing energy streams among the energy devices; and for storing or delivering energy from the energy storage devices (e.g., in coordination with a grid operator). The energy computing framework 112 can include, for example, software, tools, methods and/or protocols for measuring, calculating, transforming and monitoring operations, performance, generation, storage, delivery and distribution of energy in one or more energy storage devices. The frameworks 111, 112 (or any of the frameworks 105) can include algorithms and logic that may alternatively be included in one or more of the applications of the energy operating system 101. The frameworks 111 and 112, or any of the frameworks 105, can include commands, algorithms and logic for interfacing or calling another framework. For example, the energy computing framework 112 can include the capability to interface with, request information from and submit commands to one or more drivers. Thus, when one of the applications of the energy operating system is implemented, it can employ one or more frameworks, and each framework can provide functionality needed for implementing the application. Various levels of functionality may be distributed across applications and frameworks to streamline execution across various applications of the energy operating system. For example, functionality may be modularly arranged or organized to streamline co-optimization across applications, as described in more detail elsewhere herein.

The energy operating system 101 can be a modular software system. For example, the applications 102, 103, 104 and libraries and drivers 109 can be added on to the system module by module (e.g., device by device, application program by application program). In some cases, other frameworks 106, 107, 108, 110, 111, 112, 113 can be modular. The core 101 of the system 100 can include an energy computing module for optimizing the operation of the energy storage system based on adaptive rules and algorithms for each of the services (e.g., services implemented by applications 102, 103, 104). The co-optimization across applications can be implemented in accordance with one or more objectives of the energy operating system, such as, for example, an objective based on economic considerations (e.g., maximization of profit, maximization of capacity factor), or an objective based on reliability considerations. Thus, the energy operating system can be used to coordinate the components of an energy storage system (or multiple networked energy storage systems) to capture value from the energy services provided using the energy operating system (e.g., energy service implemented with the energy service applications).

The implementation of the applications can lead to various outputs, such as, for example, adaptive operational signals (e.g., control signals) for energy storage system hardware components and/or peripheral devices (e.g., communicated to devices using the drivers of the system).

The outputs can include reporting functions. The reporting functions can be implemented as one or more applications in conjunction with one or more frameworks 105, such as, for example, the library 109, the database 110, an energy accounting framework 113, and or other modules. The energy accounting framework 113 can include an economic interface, including generating standardized economic reports, calculating economic parameters and indicators, performing statistical analysis, performing economic projections and forecasts etc. In some examples, the reporting functions can be generated automatically within a database (e.g., programmed database) or implemented within a library. The present disclosure provides hardware for implementing operating systems provided herein. The hardware can be dedicated for use with energy storage systems or shared for the operation of other energy system components and functions.

Figure 2:
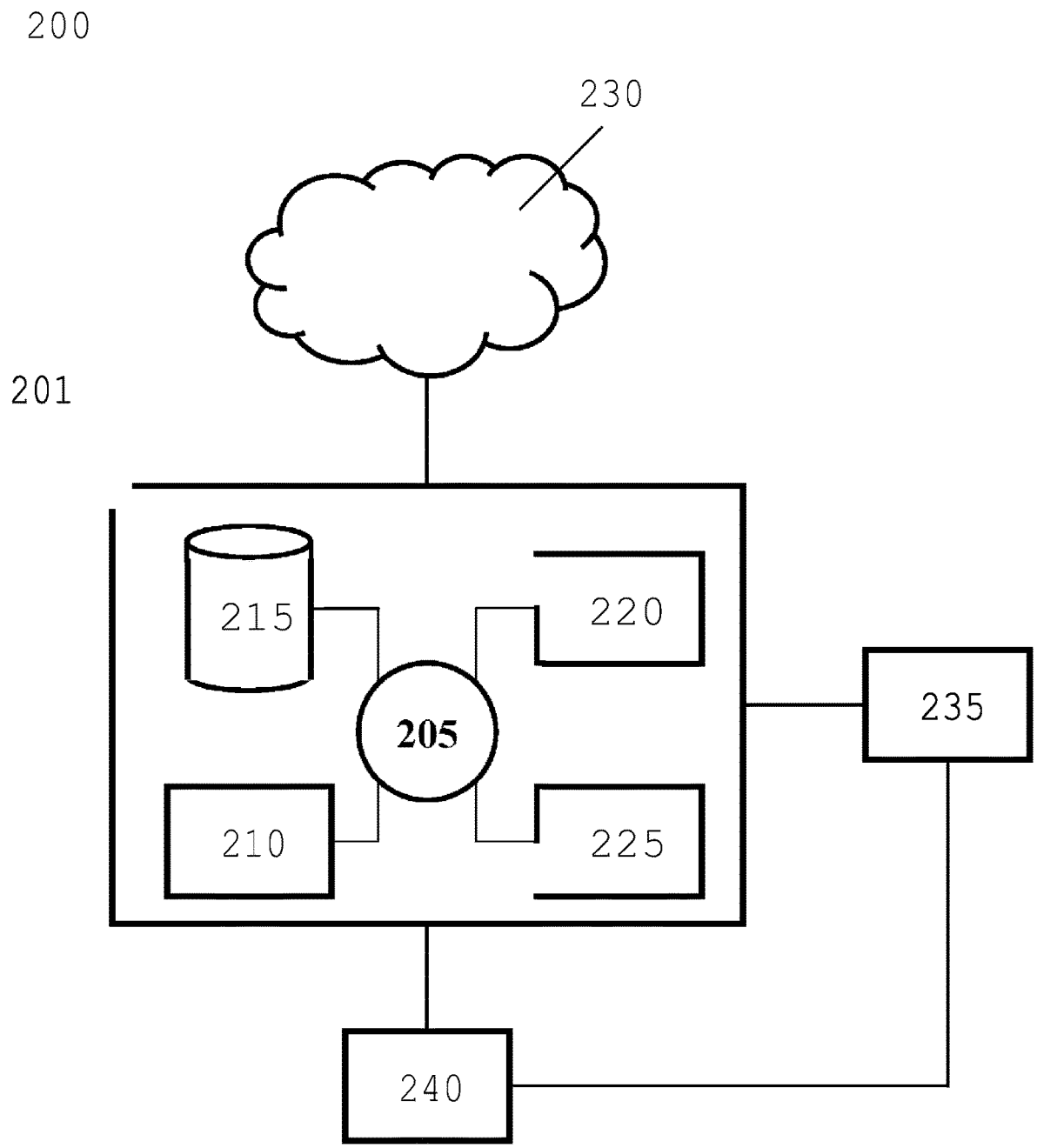
FIG. 2 schematically illustrates a system comprising an adaptive energy storage operating system, in accordance with various embodiments of the present disclosure.

FIG. 2 shows a system 200 comprising a computer system (or server) 201 with an adaptive energy storage operating system, in accordance with various embodiments of the present disclosure. The server 201 includes a central processing unit (CPU, also "processor" and "computer processor" herein) 205, which can be a single core or multi core processor, or a plurality of processors for parallel processing. The server 201 also includes memory 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The server 201 can be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the server 201, can implement a peer-to-peer network, which may enable devices coupled to the server 201 to behave as a client or a server.

The server 201 can include an operating system with a program that is configured to interface with a load, such as an energy storage device or power grid, a power meter or a power converter. The server 201 is configured to communicate with various types of energy storage devices and/or power generation systems, such as batteries, hydroelectric devices, wind turbines, photovoltaic systems, geothermal systems, nuclear power plants, and the power grid. The server 201 includes drivers for communicating with various types of energy storage devices, power meters and/or power converters, libraries for performing various functions, and applications for permitting a user to perform various user-specific functions in the context of energy storage. The server 201 in some cases is exclusively dedicated to energy storage. In some cases, the operating system of the server 201 includes no more than the features (e.g., drivers, libraries) that are required to permit the server 201 to be used to manage, operate, monitor and/or optimize energy storage devices and power generation systems.

The server 201 is in communication with an energy storage or power generation system 235, such as a battery (e.g., solid state battery, electrochemical battery), power grid, renewable energy source (e.g., wind turbine, photovoltaic system, geothermal system, wave energy system). The server 201 can be in communication with other load 240, such as a power grid (e.g., smart grid) or local loads (e.g., lighting systems, heating/cooling systems, and computing systems). The server 201 can be in communication with a power meter, power relay, or a power converter. The energy storage or power generation system 235 can be coupled to the load 240 for distribution/transmission of energy between the energy storage or power generation system 235 and the load 240.

Adaptive Automation Control

Present energy automation control software (eACS) and energy operating systems are able to perform the basic function of managing the operation of one or more energy assets or devices. However, they lack tools and features that are critical for the ultimate goals of energy efficiency and economic optimization. One type of conventional eACS is SCADA, known to people skilled in the field of energy operating systems. These systems facilitate control of energy assets/devices but do not have native energy applications; they are essentially communication channels that operate among energy applications, energy devices/assets, and data stores. Although there are financial tools, such as spreadsheets and other modeling software in the market, they do not link directly to SCADA or similar existing energy systems and lack any degree of integration into these conventional systems.

Another disadvantage of SCADA and similar systems is the need for manual intervention and decision-making by human operators who oversee the operations. It is difficult for such operators to co-optimize applications and devices and are more likely to make errors and not see potential inefficiencies regarding various aspects of the system.

Recognized herein is the need in the energy operating system and automation control field for more sophisticated tools and features that enable predictive analytics, dynamic and intelligent aggregation, asset-availability balancing for operations, the co-optimizations of multiple operations, and forward-lifetime modeling of energy storage systems and other energy assets. Energy automation control software and operating systems need to advance to the next level and enable energy asset optimization and cost savings. In other words, energy control and operating systems should have more intelligence by integrating tools such as predictive analytics engines, rich data streams and methodologies needed to operate energy systems.

The present disclosure provides methods and systems for optimizing an energy storage system's lifetime performance and application economics. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for linking a transactive energy system design to process automation are described. One aspect of the invention includes a design process that provides a predictive analytics engine at its core. At a high level, this design process includes three models: application modeling, health/asset modeling, and revenue modeling. The health/asset model has many inputs, for example an energy storage system health model is the combination of the application model with storage life characteristic data, described below, that comprises electrical efficiency, effective capacity, and capacity fade as a function of temperature, Voltage range, and calendar life. The health/asset model can be for any type of device/asset. These models enable a predictive analytics engine to inform energy automation control software (eACS) how to operate. The inventive concept involves utilization of various core data communication methods. One primary aspect is that the predictive analysis uses the same algorithms and processes as those used in the actual eACS and energy operating system. The continuity from analytics to operations improves the accuracy of the economic models, which reduces risk to financial planning and system financing.

At the center of the present invention is the energy operating system which includes eACS. The energy operating system described here is developed by Growing Energy Labs, Inc. (GELI) of San Francisco. As described in U.S. patent application Ser. No. 13/898,283, filed on May 20, 2013, now U.S. Pat. No. 9,817,376, the eACS developed by and assigned to GELI has numerous novel features and is referred to as an adaptive energy operating system (aEOS). For example it is able to operate one to multiple applications from one or more assets, providing a flexibility and scalability not found in conventional ACS. It also has other features although not directly related to the inventive concepts described herein. A primary methodology described in the earlier patent and important to the novel features described here is that every energy asset or device can be utilized for multiple applications. The inventive concepts of the present invention are embodied in the aEOS but parts may perform functions and create data streams from other locations. It is helpful to keep in mind that the benefits and utilization of the present invention are not dependent on novel improvements in the aEOS described and claimed in U.S. patent application Ser. No. 13/898,283. The methodologies and data streams, and benefits derived therefrom of the present invention, can be manifested or realized in a setting where there is only one energy asset (e.g., an energy storage system) and one application. However, it is expected that the methodologies and data streams of the present invention will be used in more complex environments having multiple assets, applications, consumers, etc., and that the flexible, scalable, multiple-application enabled aEOS described earlier will likely be utilized.

In one embodiment of the present invention, there are two enabling core data methods, characterized as data streams. These data streams, combined with certain storage lifetime characteristics data, described below, and historical data drive the transactive energy aspect of the present invention which includes predictive analysis, dynamic and intelligent data aggregation, asset-availability balancing for operations, multiple operations co-optimizations, and forward-lifetime modeling of energy storage systems and other energy assets.

Figure 3:
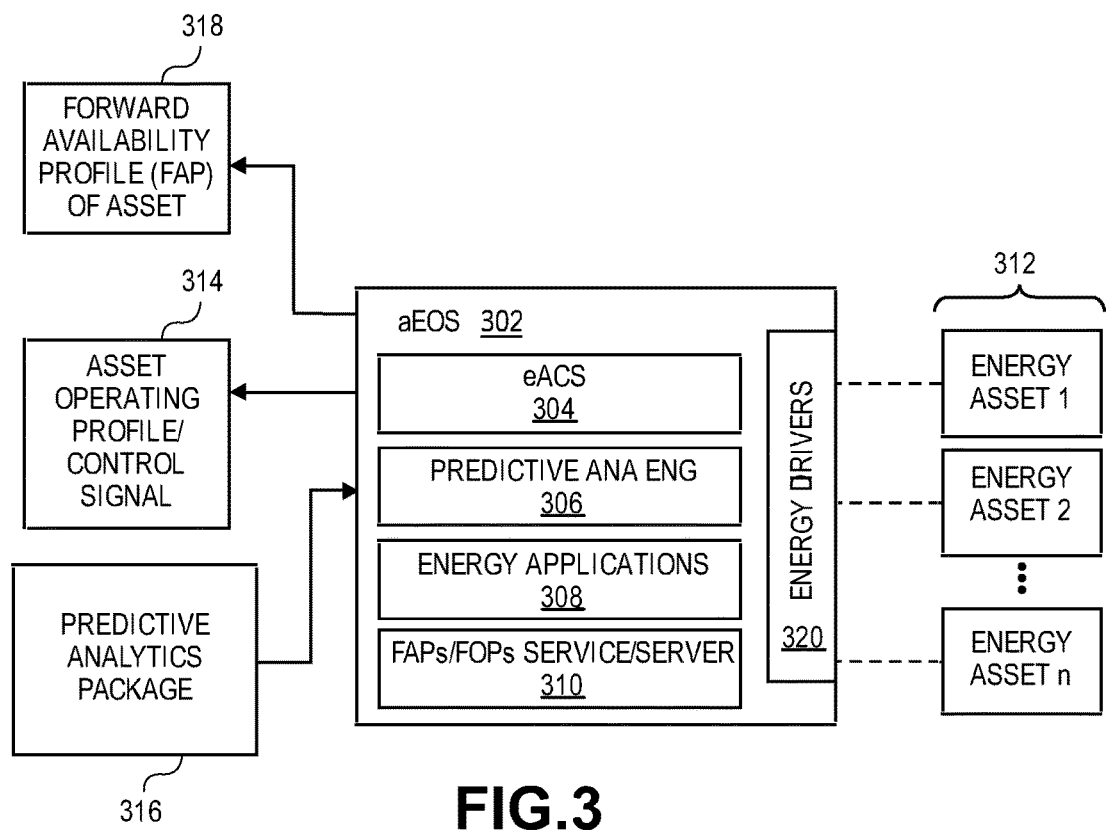
FIG. 3 is a block diagram showing an aEOS configuration in accordance with one embodiment of the present invention.

FIG. 3 is a block diagram showing an aEOS configuration in accordance with one embodiment of the present invention. An aEOS configuration, for example, aEOS 302 includes a predictive analytics engine 306. It also has one or more energy-related applications 308. Operating in conjunction with or within aEOS 302 is a server for creating and utilizing certain profiles, specifically a forward operating profile (FOP) and a forward availability profile (FAP), referred to as a FOP/FAP server 310. Adoptive energy operating system 302 is in communication with one or more energy assets or devices 312. There is a wide variety of such devices or assets, a few common examples include energy storage systems (ESS, battery plus power converter), HVAC, load switches, lighting, chillers, EV chargers, solar panels, CHP, and diesel generators. In the described embodiment, an ESS is used to illustrate the present invention. Applications 308 in aEOS 302 direct the function performed by the eACS 304 on the energy devices—it is the type of management or service being done on the devices. These applications include demand response, demand management, time-of-use shifting, frequency regulation, power quality, backup power and load islanding, etc. Also contained in aEOS 302 are energy asset drivers 320 for communicating with assets 312.

One of the outputs from aEOS 302 is an asset operating profile 314, described below. Another output is FAP of an asset 318. One of the inputs to aEOS 302, specifically for predictive analytics engine 306, is a predictive analytics package 316.

In one embodiment of the present invention, aEOS 302 contains intelligence on how to co-optimize performance of the one or more devices that are in communication with it. In an alternative embodiment, there is also a cloud configuration wherein the aEOS 302 operates on remote servers and connects to devices/assets via a gateway component. The aEOS 302 is able to perform certain predictive analytics with respect to the operation and management of the devices. This is done by the predictive engine in aEOS 302 which operates on what is described below as a predictive analytics package.

The predictive analysis of the present invention uses or simulates energy service applications, algorithms, and methods that are very similar or identical to those used in aEOS 302. This aspect of the invention, combined with using rich historical data from the customer, enables highly accurate predictions with respect to ESS performance and other asset optimization and cost efficiency (financing).

Figure 4:
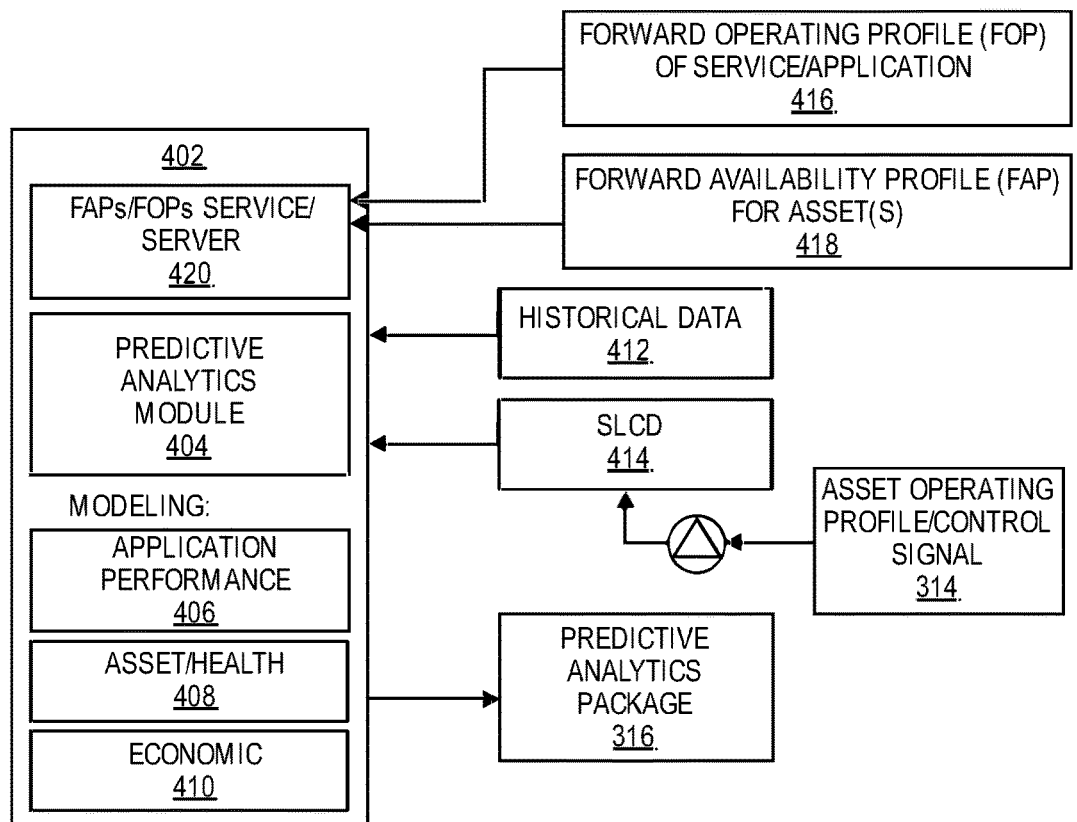
FIG. 4 is a block diagram showing components and data streams in accordance with one embodiment.

One critical component of the present invention is a predictive analytics package created from specific types of modeling. Outputs of this modeling (or design process) are profiles that are ultimately used to optimize asset operations. These are shown in FIG. 4. In one embodiment, three types of modeling are performed. One may be described as application (or performance) modeling. The objective with this modeling is to examine how an energy asset is performing over time by looking at historical output data for the device while operating to perform an operation/application. Another type is health/asset modeling of the energy device. With this modeling, an asset, such as an ESS or HVAC, is examined to see how it degrades as a function of being used. There is also a financial model for the asset or system. Here revenue that the asset is likely to generate over its lifetime by performance of a specific application is predicted. In one embodiment a dynamic rate structure library is used to connect energy operations to the economics in real time. Such economic modeling or logic does not presently exist in conventional ACS (typically an external business intelligence software suite is used to derive similar type data and decisions based on such software are made by human operators).

In one embodiment, historical data may be used to perform the modeling. This data is obtained from the entity operating the ACS and energy assets. For example, historical data on the different applications and devices may be derived from smart meters, bills, and other data.

In a specific embodiment of the present invention in which an ESS is described, storage life characteristics data (SLCD) is used in the modeling and overall predictive analysis of the asset for a specific application. In one implementation, this data is a multidimensional data set that enumerates how the battery performs for efficiency, effective capacity, and capacity fade as a function of charge rate, discharge rate, voltage range, temperature, and calendar life (battery age). The SLCD is used mostly in asset/health modeling but may be used in the other models. The SLCD is used as matrix element data, database architectures, or fit with parametric functions.

In one embodiment, the data is used to model battery degradation, application performance and economic returns. Historical data from the customer is combined with a specific application, for example, demand charge management (DCM), to generate a forward operating profile (FOP) for the energy storage system. A FOP may be instantiated, for example, as the output from a power converter system to the energy storage system. For an energy storage system, the battery's state of charge and the power converter's power capability may be considered as the asset's forward availability profile (FAP). A battery's energy storage capacity may be assigned, in full or in part, to one or more applications. For example, when the probability of peak demand event is high, all the battery's capacity may be assigned to the DCM application, and the battery will be unavailable to perform other applications (zero FAP). When the probability of a facility peak is low, only a portion of battery's capacity will be assigned to DCM and the rest of the FAP can be partitioned among other applications. The energy storage characteristic functions are derived from tables, which can be represented as heat maps shown in FIG. 6. The output of the asset/health model is the lifetime performance profiles. The tables in FIG. 6 with charge and discharge on the axes show efficiency (round trip), effective capacity, and capacity fade which are also functions of temperature, voltage range, and calendar life. Raw battery data is generated from operations of the energy operating system. This data is compared to the SLCD in order to update the model. FOPs are modeled with the SLCD to forecast efficiency losses, operational performance, and degradation. The output of this model can be used, in an iterative process, to modify and optimize the FOP. The SLCD was originally designed with ESS in mind; however, because it essentially measures lifetime efficiencies, degradations, and limitations, it can be used with other types of energy assets, such as HVAC or generators. Predicting how a particular ESS ages as a function of use is critical to de-risk the financing of energy storage applications.

As noted, given the charge and discharge rates of the ESS (battery), along with temperature, voltage range, calendar life, etc., the model generates energy storage characteristic functions including efficiency, effective capacity, and capacity fade.

In one embodiment, the effects of other applications on an asset can be used to create the predictive analytics package in a feedback loop. The difference between the prediction, derived from the modeling, and the actual operational performance of the asset is used to update the model. After each model update the application profile and FOP are re-computed. This can be characterized as a continuous correction, that is, in real-time, updating the behavior of an energy asset.

FIG. 4 is a block diagram showing components and data streams in accordance with one embodiment, most of which have been described above, but are shown together here. The primary component 402 contains a predictive analytics module 404 that creates, in part, predictive analytics package 316 which is transmitted via a suitable communications means to aEOS 302. The modeling component is comprised of three modeling modules: application performance 406, asset/health 408, and economic 410. Inputs to module 402 include historical data 412 of the energy asset users, such as bills, smart meter data, and other customer data. The other input to module 402 includes SLCD 414 which is created in part from deltas derived from asset profiles 314. The result of the modeling is FOPs/FAPs that are used together with the modeling to create predictive analytics package 316. Also shown is an FOP/FAP server 420 similar to the one shown in FIG. 3. It accepts as input FOP for service/application 416 and FAP for asset 418.

In one embodiment, a device/asset FAP is calculated to fulfill an application/operation FOP and both profiles are contained in the predictive analytics data package. As noted, working in conjunction with aEOS is a FAPs/FOPs method and server. It can operate as a remote server (in the cloud) or locally with the energy assets and eACS, or anywhere in the network. In one embodiment, an FAP contains at least three features in a "behind the meter" example: power (kW), amount of energy used in future (Kw/h), and economic function or indicator ($), which likely contains a variety of factors and may function as a tuning parameter. An FOP has a power profile as well as an economic profile.

In the battery or ESS embodiment, the predictive analysis and the operations profile may be used to ensure or check ESS warranty compliance, and automatically alert the operator in the event of aberrant behavior. In another use case, the data may be helpful in checking financial compliance of the ESS or other asset.

In one embodiment, an asset is calculated to have a forward availability profile (FAP). It should also be noted that multiple assets will each have their own FAP and that the FAPs may be collected and indexed into an individual FAP. In one embodiment, calculations done to derive a FOP are done on an asset. During typical operation, there is one operation performed on one asset, which may have multiple applications (e.g., peak shifting, demand response, stabilization, etc.) which can be performed concurrently. This is an aspect of the co-optimization that determines the partitioning of capacity. An FOP becomes an OP or AP at energy asset runtime. This asset profile contains actual runtime data comprised of raw data that may be used to extract elements from SLCD.

Figure 5:
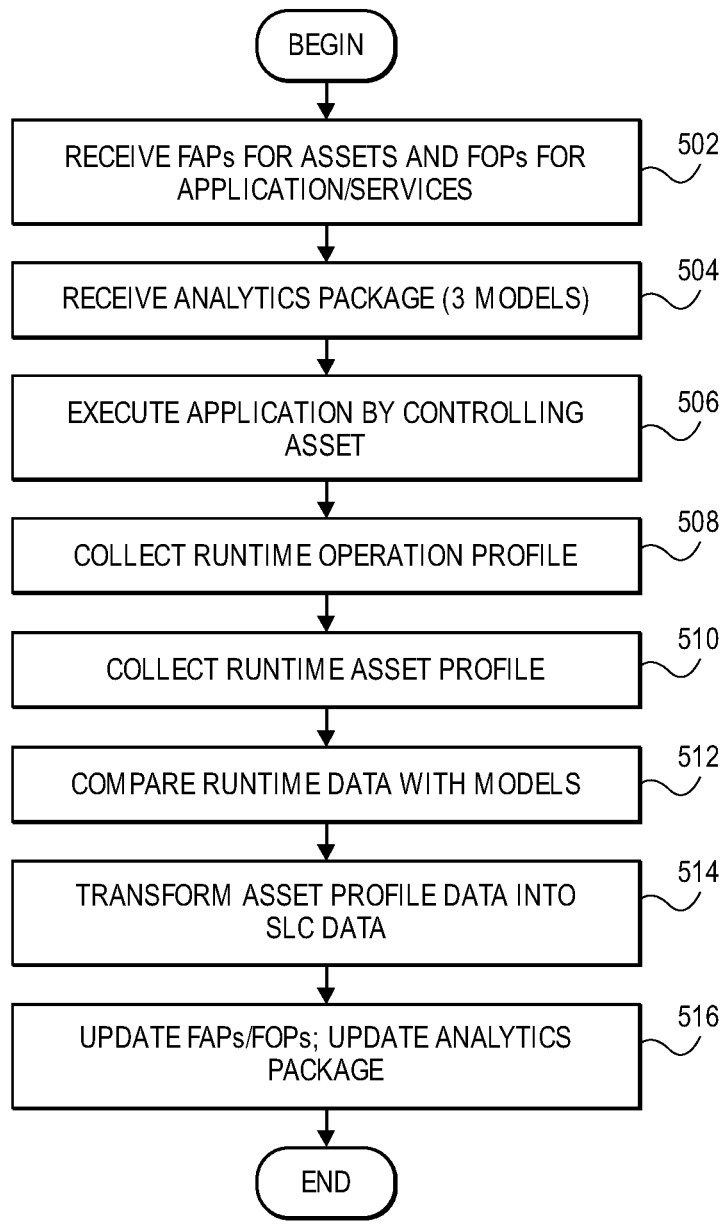
FIG. 5 is a flow diagram of a process in accordance with one embodiment describing in part the process within the aEOS.

FIG. 5 is a flow diagram of a process in accordance with one embodiment describing in part the process within the aEOS. At step 502 the aEOS receives FAPs (kW, kW/h, and $) for one or more assets and FOPs (kW) for one or more energy applications or services. At step 504 the aEOS receives a predictive data analytics package which contains the models described above for application performance, asset/health, and costs. More specifically, it contains the three matrices described below, each a function of temperature, voltage range (V2–V1), and point in time in calendar life of asset. At step 506 one or more energy applications are executed by controlling an asset within the FAP according to FOP or energy application. At step 508 the aEOS collects data for an application runtime profile. At step 510 it collects data for an asset runtime profile. At step 512 the runtime data from the two profiles are compared with the three models or matrices. At step 514 the asset profile data is transformed into data that can be stored in SLDC. At step 516 the FAPs and FOPs are updated and a new (updated) predictive analytics data package is created.

Figure 6:
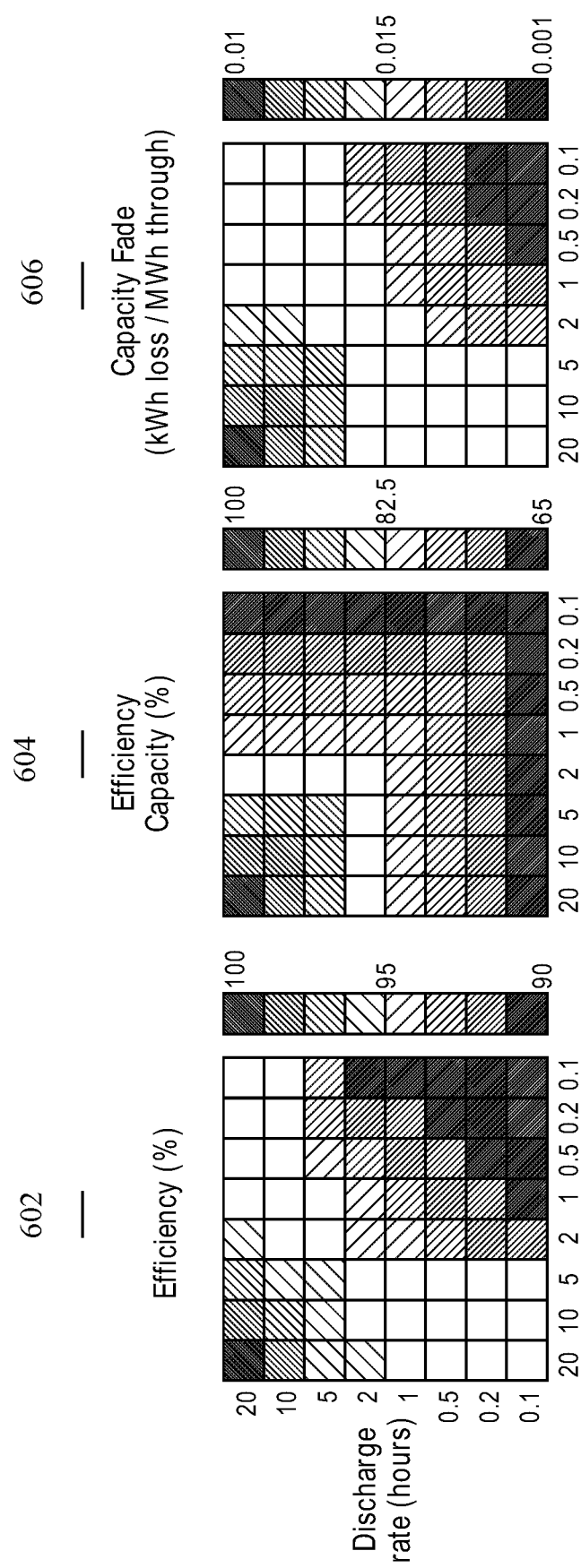
FIG. 6 is a diagram showing three matrices relevant to storage life characteristic data in accordance with one embodiment of the present invention.

FIG. 6 is a diagram showing three matrices relevant to storage life characteristic data in accordance with one embodiment of the present invention. The x-axis for all three shows charge rate (hours) and the y-axis shows discharge rate (hours). Matrix 602 shows efficiency (%), matrix 604 shows efficiency capacity (%), and matrix 606 shows capacity fade. The three variables shown in matrices 602-606 (efficiency, efficiency capacity, and capacity fade) are dimensional. The tables reveal one slice or instance through this space at a 1) specific temperature, 2) voltage range, and 3) point in calendar life. The data in tables 602-606 change resulting in new tables when the temperature, voltage range or calendar life data changes.

Aspects of systems and methods described herein may be implemented with the aid of a computer processor, or implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discreet logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. The data and/or instructions can be embodied in non-transitory tangible computer-readable media. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof Examples of transfers of such formatted data and/or instructions by carrier waves include, but are not limited to, transfers (uploads, downloads, email, etc.) over the Internet and/or other computer networks via one or more data transfer protocols (e.g., TCP, UDP, HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs. Systems and methods described herein may be provided to a user via a graphical user interface.

Systems and methods of the present disclosure may be combined with and/or modified by other systems and methods, such as, for example, systems and/or methods described in U.S. Patent Publication No. 2006/0259255 ("METHOD OF VISUALIZING POWER SYSTEM QUANTITIES USING A CONFIGURABLE SOFTWARE VISUALIZATION TOOL"), U.S. Patent Publication No. 2012/0109798 ("METHODS AND APPARATUS FOR MANAGING RENEWABLE ENERGY SERVICES FOR FIXED AND MOBILE ASSETS"), U.S. Patent Publication No. 2012/0109403 ("METHODS AND APPARATUS FOR MANAGING ENERGY SERVICES FROM A PLURALITY OF DEVICES"), U.S. Patent Publication No. 2012/0101639 ("MICROGRID CONTROL SYSTEM"), U.S. Patent Publication No. 2012/0083930 ("ADAPTIVE LOAD MANAGEMENT: A SYSTEM FOR INCORPORATING CUSTOMER ELECTRICAL DEMAND INFORMATION FOR DEMAND AND SUPPLY SIDE ENERGY MANAGEMENT"), U.S. Patent Publication No. 2012/0117411 ("ENERGY CAPTURE OF TIME-VARYING ENERGY SOURCES BY VARYING COMPUTATIONAL WORKLOAD"), U.S. Patent Publication No. 2012/0116955 ("CHARGING PURCHASES TO UTILITY ACCOUNTS"), U.S. Patent Publication No. 2012/0109797 ("METHODS AND APPARATUS FOR RECONCILIATION OF A CHARGING EVENT"), U.S. Patent Publication No. 2012/0089261 ("GRID CONNECTED POWER STORAGE SYSTEM AND INTEGRATION CONTROLLER THEREOF"), U.S. Patent Publication No. 2012/0068540 ("ENERGY STORAGE SYSTEM FOR BALANCING LOAD OF POWER GRID"), U.S. Patent Publication No. 2012/0059532 ("METHOD AND DEVICE FOR THE DIRECTIONAL TRANSMISSION OF ELECTRICAL ENERGY IN AN ELECTRICITY GRID"), U.S. Patent Publication No. 2012/0059527 ("DISTRIBUTED ENERGY STORAGE SYSTEM, AND APPLICATIONS THEREOF"), U.S. Patent Publication No. 2012/0053750 ("OPTIMIZATION OF ENERGY STORAGE DEVICE USAGE IN WIND ENERGY APPLICATIONS"), U.S. Patent Publication No. 2016/0036272 ("PREDICTING AND OPTIMIZING ENERGY STORAGE LIFETIME PERFORMANCE WITH ADAPTIVE AUTOMATION CONTROL SOFTWARE"), U.S. Patent Publication No. 2012/0049516 ("METHOD, SYSTEM, AND COMPUTER PROGRAM PRODUCT TO OPTIMIZE POWER PLANT OUTPUT AND OPERATION"), U.S. Patent Publication No. 2012/0046795 ("METHOD AND APPARATUS FOR EXTENDING LIFETIME FOR RECHARGEABLE STATIONARY ENERGY STORAGE DEVICES"), U.S. Patent Publication No. 2012/0029897 ("DYNAMIC DISTRIBUTED POWER GRID CONTROL SYSTEM"), and U.S. Patent Publication No. 2012/0029716 ("SUPERVISORY CONTROL METHOD AND EQUIPMENT FOR SMART GRIDS"), each of which is entirely incorporated herein by reference.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A method for remotely operating a distributed energy asset that is configured to perform a plurality of energy applications, said method comprising:
    (a) generating an application performance model for each of said plurality of energy applications performed by said energy asset;
    (b) generating a health model for said energy asset;
    (c) generating a revenue generation model for said energy asset;
    (d) generating an energy asset model for said energy asset based on said application performance models, said health model, and said revenue generation model;
    (e) based on said energy asset model, generating an initial forward availability profile for said energy asset, wherein said initial forward availability profile defines at least a distribution of battery capacity among said plurality of energy applications performed by said energy asset that co-optimizes performance of said plurality of energy applications; and
    (f) transmitting at least one control signal to said energy asset based on the initial forward availability profile, the at least one control signal controlling said energy asset to operate in accordance with the initial forward availability profile.

2. The method of claim 1, wherein (a) comprises analyzing historical output data captured during performance of each energy application by said energy asset.

3. The method of claim 1, wherein (b) comprises analyzing degradation of said energy asset over time.

4. The method of claim 1, further comprising:
    dynamically optimizing operation of said energy asset in real-time and during operation by,
    updating said energy asset model based on a difference between one or more predictions derived from said energy asset model and actual operational performance of said energy asset, and
    upon updating said energy asset model, re-computing said initial forward availability profile.

5. The method of claim 1, further comprising:
    generating a forward operating profile for each of said plurality of energy applications performed by said energy asset.

6. The method of claim 5, further comprising:
    combining said forward availability profile and said forward operating profile with energy asset characteristic data and historical data, thereby enabling predictive analysis.

7. The method of claim 5, further comprising:
    generating a predictive analytics data package containing said forward operating profile and said forward availability profile.

8. The method of claim 1, further comprising:
    performing predictive analytics for operation and management of said distributed energy asset.

9. The method of claim 1, further comprising:
simulating performance of said plurality of energy applications when performing the modeling.

10. The method of claim 1, wherein (b) comprises examining degradation as a function of use.

11. The method of claim 1, wherein (b) comprises examining degradation as a function of calendar life.

12. The method of claim 1, wherein (c) comprises dynamically connecting energy operations with financial data.

13. The method of claim 1, wherein (c) comprises predicting revenue that said energy asset is expected generate over its lifetime.

14. The method of claim 1, wherein (a)-(e) are performed over a cloud computing platform.

15. A system for remotely operating a distributed energy asset that is configured to perform a plurality of energy applications, the system comprising:
a memory storing computer readable instructions; and
processing circuitry configured to execute the computer readable instructions to,
(a) generate an application performance model for each of said plurality of energy applications performed by said energy asset,
(b) generate a health model for said energy asset,
(c) generate a revenue generation model for said energy asset,
(d) generate an energy asset model for said energy asset based on said application performance models, said health model, and said revenue generation model,
(e) based on said energy asset model, generate an initial forward availability profile for said energy asset, wherein said initial forward availability profile defines at least a distribution of battery capacity among said plurality of energy applications performed by said energy asset that co-optimizes performance of said plurality of energy applications, and
(f) transmit at least one control signal to said energy asset based on the initial forward availability profile, the at least one control signal controlling said energy asset to operate in accordance with the initial forward availability profile.

16. The system of claim 15, wherein (a) comprises analyzing historical output data captured during performance of each energy application by said energy asset; and
wherein (b) comprises analyzing degradation of said energy asset over time.

17. The system of claim 15, wherein the processing circuitry is further caused to:
dynamically optimize operation of said energy asset in real-time and during operation by,
updating said energy asset model based on a difference between one or more predictions derived from said energy asset model and actual operational performance of said energy asset, and
upon updating said energy asset model, re-computing said initial forward availability profile.

18. The system of claim 17, wherein the processing circuitry is further caused to:
generate a forward operating profile for each of said plurality of energy applications performed by said energy asset; and
combine said forward availability profile and said forward operating profile with energy asset characteristic data and historical data, thereby enabling predictive analysis.

19. The system of claim 18, wherein the processing circuitry is further caused to:
generate a predictive analytics data package containing said forward operating profile and said forward availability profile; and
perform predictive analytics for operation and management of said distributed energy asset.

20. The system of claim 15, wherein the processing circuitry is further caused to:
simulate performance of said plurality of energy applications when performing the modeling.

* * * * *